United States Patent [19]

Lipschutz

[11] 4,281,526

[45] Aug. 4, 1981

[54] ANTI-THEFT DEVICES FOR MOTOR VEHICLES

[75] Inventor: Paul Lipschutz, Croissy, France

[73] Assignee: Neiman S.A., Courbevoie, France

[21] Appl. No.: 41,219

[22] Filed: May 21, 1979

[30] Foreign Application Priority Data

Jun. 8, 1978 [FR] France ............... 78 17254

[51] Int. Cl.³ ............. B60K 20/04; B60R 25/06
[52] U.S. Cl. .................. 70/202; 70/205; 70/247; 70/254; 74/850; 74/879; 74/524; 180/333; 200/61.88
[58] Field of Search ........... 200/61.88; 74/879, 850, 74/524; 70/247, 204, 248, 245, 251, 254, 205, 206, 196, 202, 192, 201, 210, 211; 180/77 H

[56] References Cited

U.S. PATENT DOCUMENTS

| | | | |
|---|---|---|---|
| 195,724 | 10/1877 | Noyes | 70/210 X |
| 771,155 | 9/1904 | Jamison | 70/196 |
| 1,391,200 | 9/1921 | Mentzer | 70/204 X |
| 1,552,408 | 9/1925 | Anderson | 70/204 |
| 1,694,011 | 12/1928 | Hosford | 70/254 |
| 1,696,278 | 12/1928 | McKay et al. | 70/254 |
| 1,719,368 | 7/1929 | Hibbets | 74/524 X |
| 1,819,688 | 8/1931 | Moore | 74/879 |
| 1,879,482 | 9/1932 | Quintenz | 70/210 X |
| 2,447,079 | 8/1948 | McKinnie et al. | 74/524 X |
| 3,326,315 | 6/1967 | Richards | 74/850 X |
| 3,590,612 | 7/1971 | Henning | 70/251 X |

FOREIGN PATENT DOCUMENTS

| | | | |
|---|---|---|---|
| 2302427 | 7/1974 | Fed. Rep. of Germany | 74/524 |
| 2700976 | 7/1978 | Fed. Rep. of Germany | 70/247 |
| 737546 | 12/1932 | France | 70/237 |
| 563899 | 6/1957 | Italy | 70/192 |
| 621149 | 4/1949 | United Kingdom | 70/211 |
| 1377952 | 12/1974 | United Kingdom | 200/61.88 |

Primary Examiner—Roy D. Frazier
Assistant Examiner—Carl F. Pietruszka
Attorney, Agent, or Firm—James C. Wray

[57] ABSTRACT

The invention relates to an anti-theft device especially but not solely for automobile vehicles which causes blocking of the gear-change lever.

The gear-change lever is articulated about an axis substantially parallel with the floor of the vehicle and close to this floor. The floor has attached to it a lock device arranged to imprison the said lever after it has been pivoted down flat.

3 Claims, 6 Drawing Figures

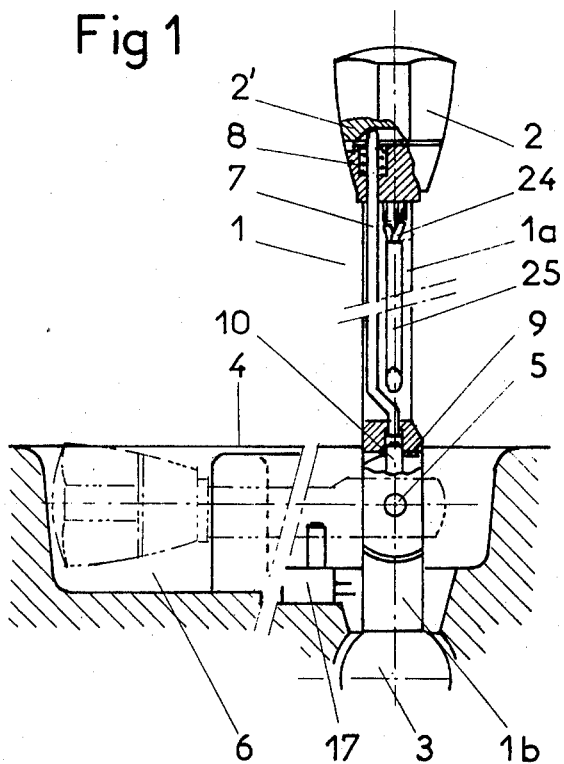
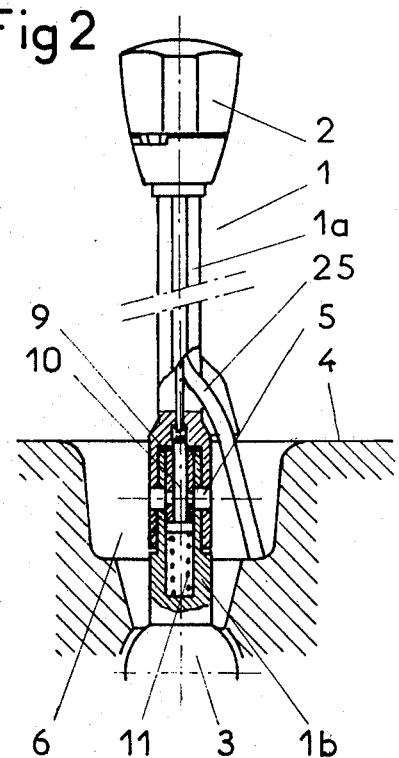
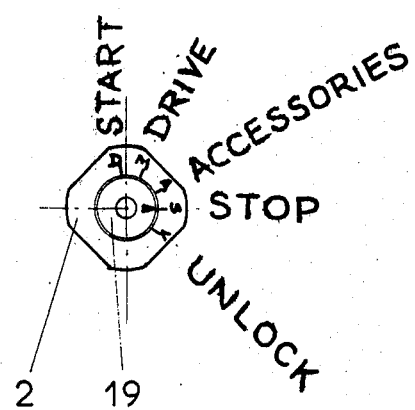

ANTI-THEFT DEVICES FOR MOTOR VEHICLES

BACKGROUND TO THE INVENTION

The invention relates to an anti-theft device especially but not solely for automobile vehicles which causes blocking of the gear-change lever.

STATEMENT OF PRIOR ART

Most of the anti-theft devices in use are intended to cause blocking of the steering column. By reason of the risk which would be caused by accidental blocking of the steering column it is necessary to take various security precautions to prevent involuntary actuation of the locking system, and this complicates the anti-theft device and increases its cost price.

It has also been proposed to block various other elements of the vehicle, such as brake, gear box etc. Certain of these proposals are not in conformity with regulations in force, and the others have not given satisfaction.

OBJECT OF THE INVENTION

The present invention proposes to furnish a new anittheft device of high security which prevents the use of the gear-change lever and with which there is associated an electric switch of the type used in combination with anti-theft devices on the steering system.

SUMMARY OF THE INVENTION

According to the invention there is provided in a vehicle having a housing disposed therein in substantially horizontal disposition, an engine, and an electrical system therefore including an ignition circuit, a lever assembly comprising a lever, essential to the operation of the vehicle, having a first portion for connection to the vehicle mechanism to be operated, extending through an aperture in the housing and a second portion pivotally mounted on the first portion about an axis disposed above the housing, said second portion of the lever being manually movable between an operative position at which the lever extends substantially vertically of said housing and a stowed position at which the lever extends along and substantially parallel to said housing, a catch member located at a position on said housing spaced from said first lever portions for effecting retention of the lever when the latter is in its stowed position, a key-operated cylinder lock for actuating said catch member to effect release of said lever, a locking rod movably disposed within said lever for locking said first and second lever portions together when in use, spring means for urging said rod into a locking position, a rotatable handle provided at the distal end of the second lever portion, a push rod operable on rotation of said handle to effect release of said locking rod, first electrical contact means mounted at said distal end of the second lever portion, and second electrical contact means provided on said rotatable handle cooperable with said first contact means on rotation of said handle, said first and second contact means serving to control the electrical system, wherein the rotatable handle in one region of rotation causes release of the locking rod and in another region of rotation causes engine starting.

BRIEF DESCRIPTION OF DRAWINGS

The invention will be clearly understood on reading of the following description given with reference to the accompanying drawings, wherein:

FIG. 1 is a diagrammatic view in lateral elevation, partially in section, of a gear-change lever according to one example of embodiment of the invention, in the working position, FIG. 2 is a view in front elevation, partially in section, of the lever according to FIG. 1, FIG. 3 is a plan view of the lever according to FIGS. 1 and 2.

DESCRIPTION OF PREFERRED EMBODIMENT

Figure 4:
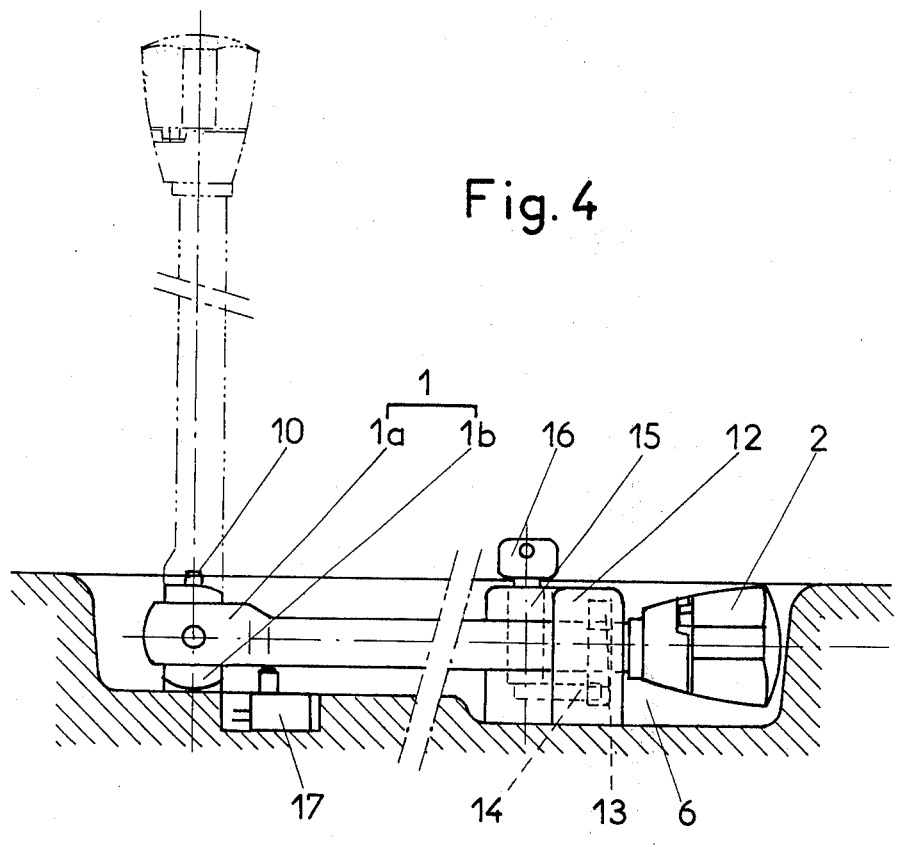
FIG. 4 is a view in lateral elevation of the lever according to FIGS. 1 to 3, in the locking position.

The gear-change lever according to the invention comprises a rod 1 terminated by a control knob 2 and fixed to a ball joint 3 situated beneath the floor 4 of the vehicle.

In accordance with the invention the rod 1 is formed in two parts 1a and 1b which are articulated to one another about a spindle 5 parallel to the floor and situated in a recess 6 of the latter which is formed so as to receive the part 1a after pivoting (FIG. 4) into a stowed position.

The part 1a contains a push rod 7 subject to the action of a spring 8 which returns it upwards. The upper extremity of the push rod 7 is pressed against a movable part 2' of the knob 2 and its lower end terminates at a certain distance from the joint surface 9 between the parts 1a and 1b. The part 1b contains a push rod 10 thrust upward by a spring 11 and the upper extremity of which, in the rest position, penetrates into the passage containing the push rod 7, so as to prevent pivoting of the part 1a about the spindle 5. If the push rod 7 is driven down by action upon the movable part 2' of the knob 2, the push rod 10 is pushed back against the action of its spring 11 until the bearing surface between the two push rods coincides with the joint surface 9. In this position pivoting of the part 1a is possible.

Figure 5:
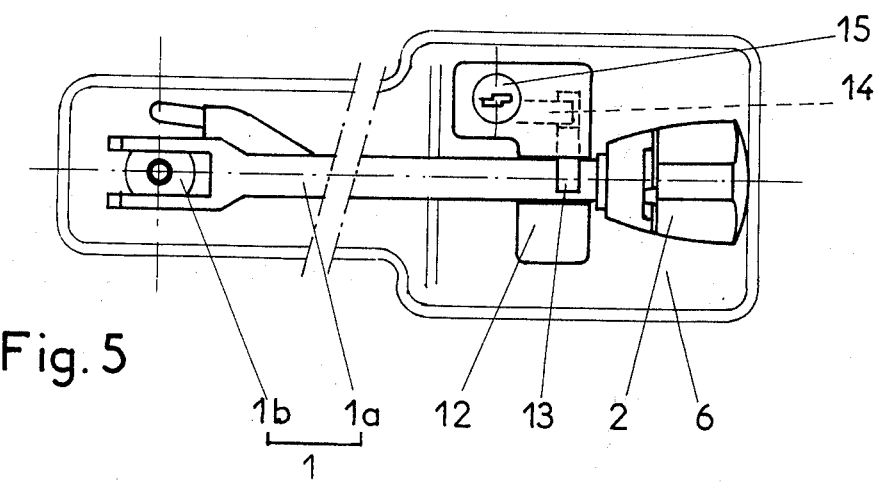
FIG. 5 is a plan view of the lever in the locking position.

In the recess 6 there is lodged a locking device 12 (FIGS. 4 and 5) which comprises a spring urged catch which retains the part 1a of the rod 1 after it has been pivoted into the stowed position. The catch 13 can be locked by a bolt 14 controlled by a security lock 15 actuated by a key 16. In the bottom of the recess 6 there is lodged a push button 17 controlling a switch for general interruption of the electric supply of the vehicle, so that in the locking position as illustrated in FIGS. 4 and 5 the electric supply of the vehicle is cut off.

The cut-out switch can likewise energise an alarm device actuated for example by the opening of the doors.

Unlocking by operation of the key 16 causes the retraction of the bolt 14 and thus liberation of the pivoting flap 13 which by its rotation pushes the rod 1 upwards, thus clearing the knob 2 from the recess 6.

When the part 1a rises again to the vertical position the push rod 10, under the action of the spring 11, engages in the lodgement of the part 1a, thus making the parts 1a and 1b fast with one another.

Figure 6:
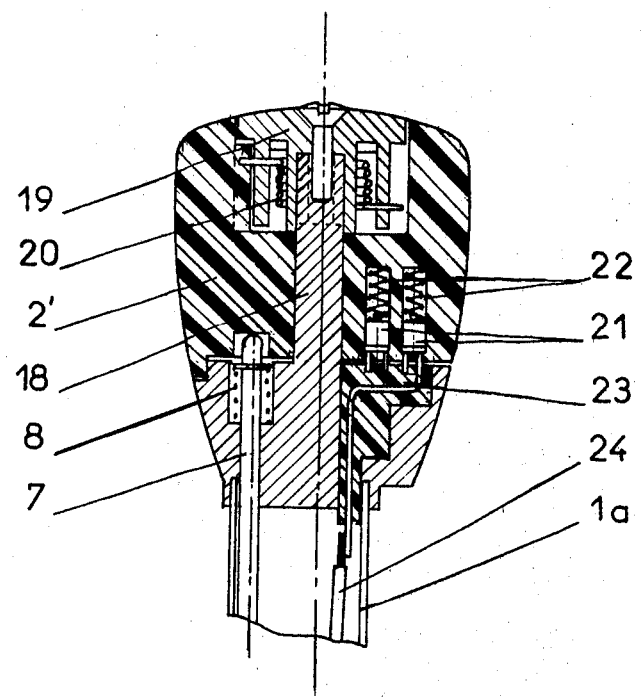
FIG. 6 is a sectional view of the knob of the lever according to FIGS. 1 to 5.

In the form of embodiment as represented in the drawing the mechanical anti-theft device further comprises an electric switch which controls the usual electrical functions and can occupy for example the positions "stop", "accessories", "drive" and "start", this switch being controlled by a portion 2' of the knob 2 which portion is rotatable for this purpose about a spindle 18 (see FIGS. 3 and 6). A visible portion 19 of the knob 2 remains fast with the spindle 18 and receives a torsion spring 20 intended to return the knob 2 from the "start" position to the "drive" position as soon as it is released. The knob 2 can further occupy an "unlock" position (FIG. 3) which permits pushing in of the rod 7, all contacts being open.

The knob 2 contains movable contacts 21 thrust by springs 22 to press against fixed contacts 23 connected to conductive cables 24 issuing in a sheath 25 from the part 1a of the rod 1 (FIG. 2).

In another form of embodiment which is not represented the electric switch is mounted on the spindle 5 and its rotation is controlled by the pivoting of the part 1a. The usual electric functions are then obtained by different positions of the part 1a in the course of its reascent.

The anti-theft device may be applied to many forms of vehicle (e.g. motor cruisers, aircraft).

I claim:

1. In a vehicle having a housing disposed therein in substantially horizontal disposition, an engine, and an electric system therefor including an ignition circuit, the provision of a lever assembly comprising
   (a) a lever, essential to the operation of the vehicle, having a first portion for connection to the vehicle mechanism to be operated, extending through an aperture in the housing and a second portion pivotally mounted on the first portion about an axis disposed above the housing, said second portion of the lever being manually movable between an operative position at which the lever extends substantially vertically of said housing and a stowed position at which the lever extends along and substantially parallel to said housing,
   (b) a catch member located at a position on said housing spaced from said first lever portions for effecting retention of the lever when the latter is in its stowed position,
   (c) a key-operated cylinder lock for actuating said catch member to effect release of said lever,
   (d) a locking rod movably disposed within said lever for locking said first and second lever portions together when in use,
   (e) spring means for urging said rod into a locking position,
   (f) a rotatable handle provided at the distal end of the second lever portion,
   (g) a push rod operable on rotation of said handle to effect release of said locking rod,
   (h) first electrical contact means mounted at said distal end of the second lever portion, and
   (i) second electrical contact means provided on said rotatable handle cooperable with said first contact means on rotation of said handle, said first and second contact means serving to control the electrical system wherein the rotatable handle in one region of rotation causes release of the locking rod and in another region of rotation causes engine starting.

2. A lever assembly according to claim 1, wherein an electric switch having a depressable operating member is provided on said housing and is connected with the vehicle ignition circuit, said switch being opened to interrupt the ignition circuit when said second lever portion is in its stowed position by engagement thereof with said operating member.

3. A lever assembly according to claim 1, wherein an electric switch connectible with the electrical system is connected to the pivot and is operated on pivoting of the second lever portion.

* * * * *